United States Patent

Nacht

[15] 3,701,143

[45] Oct. 24, 1972

[54] WALSH FUNCTION GENERATOR

[72] Inventor: George G. Nacht, Oxon Hill, Md.

[73] Assignee: The United States of America as represented by the Secretary of the Navy

[22] Filed: Aug. 24, 1970

[21] Appl. No.: 66,418

[52] U.S. Cl.......340/347 DD, 179/15 OR, 179/15 BC

[51] Int. Cl..................................................H04l 3/00

[58] Field of Search.......340/347; 179/15 OR, 15 BC

[56] References Cited

UNITED STATES PATENTS

| | | | |
|---|---|---|---|
| 3,618,077 | 11/1971 | Peterson | 179/15 BC |
| 2,894,254 | 7/1959 | Mork | 340/347 DD |
| 3,192,520 | 6/1965 | Marette et al. | 340/347 DD |
| 2,769,968 | 11/1956 | Schultheis | 340/347 DD |
| 3,261,913 | 7/1966 | Reichert | 340/347 DD |

OTHER PUBLICATIONS

Bosswetter, Walsh Function Generator, Nachtrichten–Techn. z23 (1970) No. 4. pp. 201–207; Eingangsdatum 20 October 1969

*Primary Examiner*—Thomas A. Robinson
*Assistant Examiner*—Jeremiah Glassman
*Attorney*—R. S. Sciascia, Arthur L. Branning and James G. Murray

[57] ABSTRACT

A clock driven generator which produces desired Walsh functions in response to binary number input command signals. The input command signals are connected to be operated on by various circuitry and thereby produce output signals which are individually a particular bit of a desired Walsh function. The Walsh function is obtained by scanning the output signals.

2 Claims, 4 Drawing Figures

| DECIMAL | BINARY |
|---|---|
| 0 | 0 0 0 0 |
| 1 | 0 0 0 1 |
| 2 | 0 0 1 0 |
| 3 | 0 0 1 1 |
| 4 | 0 1 0 0 |
| 5 | 0 1 0 1 |
| 6 | 0 1 1 0 |
| 7 | 0 1 1 1 |
| 8 | 1 0 0 0 |
| 9 | 1 0 0 1 |
| 10 | 1 0 1 0 |
| 11 | 1 0 1 1 |
| 12 | 1 1 0 0 |
| 13 | 1 1 0 1 |
| 14 | 1 1 1 0 |
| 15 | 1 1 1 1 |

INVENTOR.
GEORGE G. NACHT
BY
James G. Murray
ATTORNEYS

INVENTOR.
GEORGE G. NACHT

BY

James G. Murray
Richard ...

ATTORNEYS

LOGIC FOR MATRIX 10 – FIG. 2.

$E = 1$ $F = \bar{A}$ $G = A \odot B$ $H = \bar{B}$ $J = B \odot C$ $K = A \odot B \odot C$ $L = A \odot C$ $M = \bar{C}$ $N = C \odot D$ $P = A \odot C \odot D$ $R = A \odot B \odot C \odot D$ $S = B \odot C \odot D$ $T = B \odot D$ $U = A \odot B \odot D$ $V = A \odot D$ $W = \bar{D}$ WHERE $A \odot B = AB + \bar{A}\bar{B}$ $A \odot B \odot C = ABC + A\bar{B}\bar{C} + \bar{A}B\bar{C} + \bar{A}\bar{B}C$ $A \odot B \odot C \odot D = ABCD + AB\bar{C}\bar{D} + \bar{A}\bar{B}CD + \bar{A}\bar{B}\bar{C}\bar{D} + A\bar{B}C\bar{D} + A\bar{B}\bar{C}D + \bar{A}BC\bar{D} + \bar{A}B\bar{C}D$

FIG. 3.

INVENTOR.
GEORGE G. NACHT
BY
James G. Murray
ATTORNEYS

INVENTOR.
GEORGE G. NACHT
BY
James D. Murray
ATTORNEYS

WALSH FUNCTION GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Although Walsh functions have been known since 1923 when they were described in an article by J. L. Walsh that appeared in pages 5–24 of Volume 45 of the American Journal of Mathematics, the use of these functions has, until recently, been somewhat limited. In the past several years, perhaps as a result of the emergence of extremely fast-switching, two-state hardware, a tremendous increase in the use and applications research of Walsh functions has become evident. Walsh functions can be effectively utilized for signal processing and multiplexing to accomplish such tasks as signal detection or enhancement in the presence of noise, signal sorting, and signal parameter identification. Other applications result in better utilization of digital computers and more efficient processing of pulse signals. Further application are clearly foreseen in the areas of radar, sonar, telemetry, coding and cryptography, pattern recognition and biomedical signal processing.

Concurrent with the increased use and interest in Walsh functions has been a rising demand for generators which reliably produce a spectrum of Walsh functions on demand over a wide range of speeds.

To satisfy this rising demand, prior attempts to generate Walsh functions have, in general, been by the method of synthesizing a desired Walsh function from Walsh functions of lower order. This technique disadvantageously requires the use of a large computer memory and complex combining circuitry.

SUMMARY OF THE INVENTION

This invention provides a clock driven circuit which produces a desired Walsh function (or a sequence of desired Walsh functions) in response to binary type input command signals, and which does not require the use of a computer memory. More specifically, the N input command signals are connected to be operated on by circuits which, by predetermined logic, produce $2^N$ output signals which are individually a particular bit of a desired Walsh function. The Walsh function signal is obtained by scanning in sequence the $2^N$ output signals of the logic circuitry. The invention can be made to produce Walsh functions at an extremely fast rate since all components are in a state-of-the-art status that permits the use of a very high frequency clock.

OBJECTS OF THE INVENTION

An object of the invention is, therefore, to provide an improved Walsh function generator.

Another object of the invention is the provision of an improved Walsh function generator which does not require a memory and which rapidly produces desired Walsh functions in response to binary number input command signals.

A still further object of the invention is the provision of an improved Walsh function generator which is clock driven and rapidly produces desired Walsh functions by operating on N binary type input signals according to predetermined logic to produce the $2^N$ individual bits of the desired Walsh function.

DESCRIPTION OF THE DRAWINGS

Other objects and advantages of the invention will hereinafter become more fully apparent from the following description of the annexed drawings, which illustrate a preferred embodiment of the invention, and wherein:

FIG. 3 is a logic table which governs the operation of the invention and

DESCRIPTION OF THE PREFERRED EMBODIMENT

Figure 1:
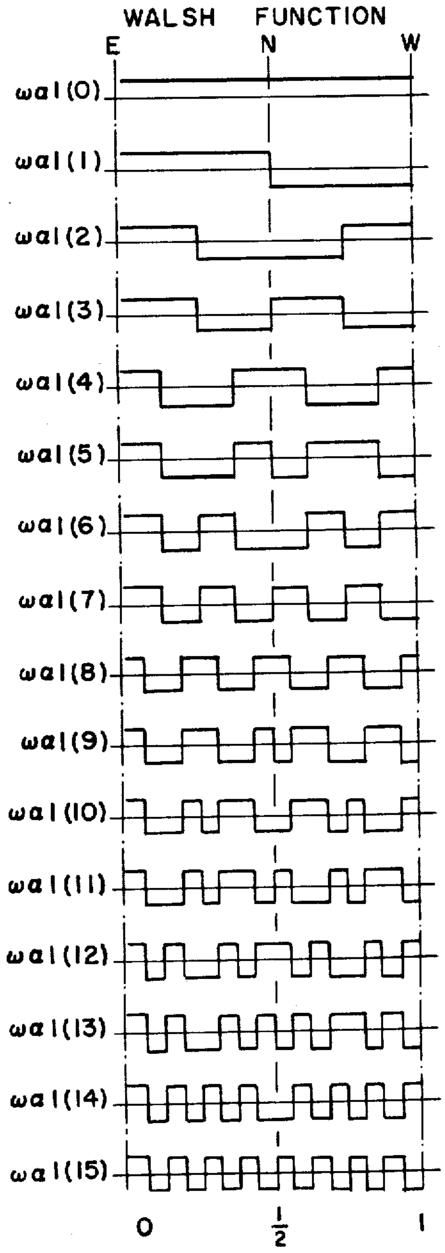
FIG. 1 shows the first sixteen Walsh functions and associated decimal and binary numbers.

The reader's attention is first directed to FIG. 1 which shows, from left to right, the decimal numbers 0–15, the binary numbers 0000–1111 and the first 16 Walsh functions, i.e. wal(0)–wal(15). It will be noted that for each Walsh function, wal($n$), the plot of the function crosses the zero axis $n$ times in the period 0 to 1 for which the Walsh functions are orthogonally defined. This, of course, is the basis for the commonly used units for measuring Walsh functions, i.e. the sequency (analogous to 2 $x$ frequency) as defined in zero crossings per second, zps, (analogous to 2 $x$ cps).

Figure 2:
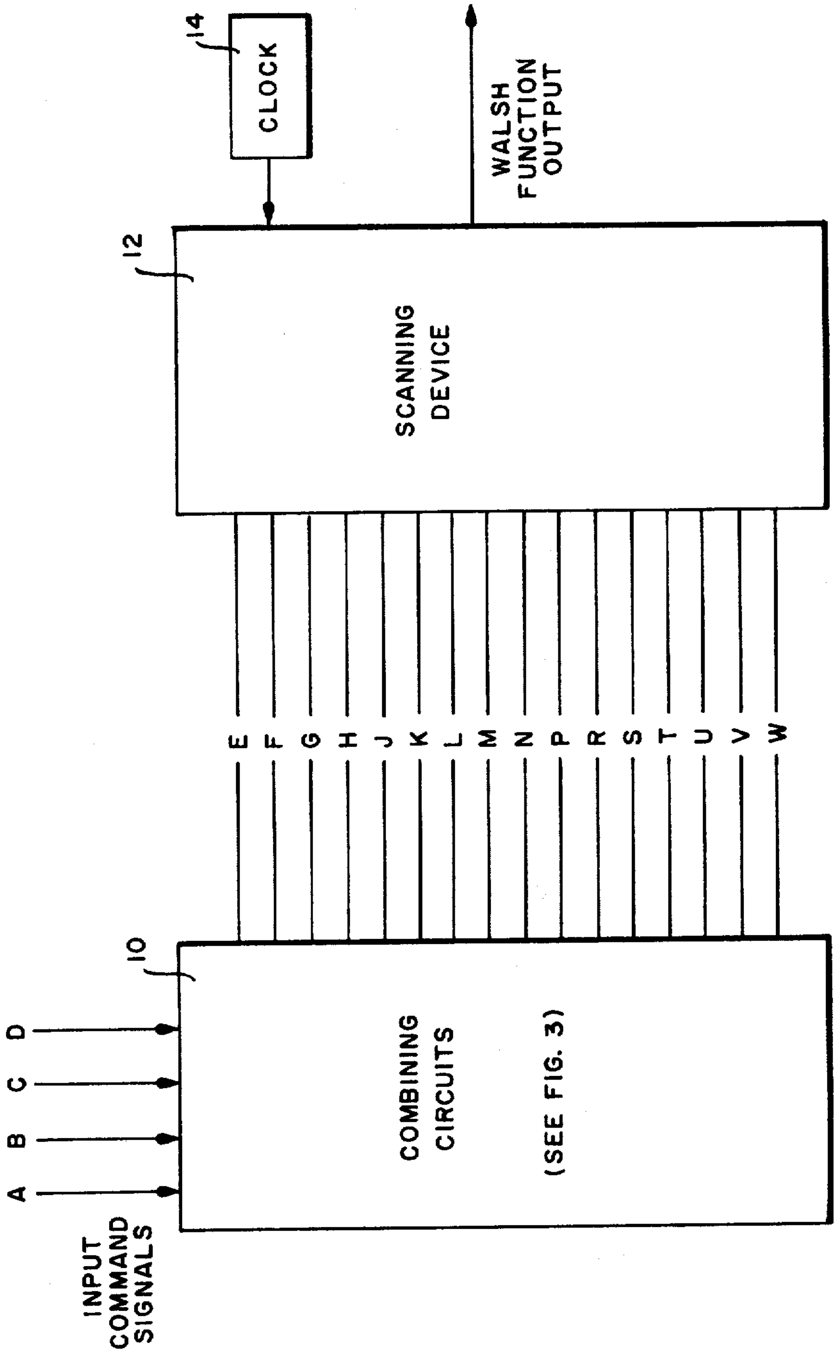
FIG. 2 illustrates the invention in block diagram form.

Consistent with the showing of the first sixteen Walsh functions in FIG. 1, the preferred embodiment of the invention, shown in FIG. 2, is capable of accepting only four bit binary input command signals. However, it will be apparent to the reader that much greater capabilities could, and would, be designed into a practical system and the four bit input and the associated discussion and generation of only the first sixteen Walsh functions are limitations used only for the purpose of making the description and drawings less cumbersome. The reader should not assume any implication that Walsh function generators or greater capacity are not feasible or within the scope of the invention.

In FIG. 2 the four binary command signals A, B, C and D can originate in a diversity of sources which are not, per se, a part of this invention and typically may be a computer, periodic (multiplex) switching, manually set switches, etc. Binary input signals A, B, C and D are connected to the combining circuits in matrix 10 which produce 16 output signals E–W (the reader will note the omission of I, O and Q because of their resemblance to the binary state symbols) in accordance with the logic equations set forth in FIG. 3 wherein signal E is always "1" and the other signals F—W are variously related to input signals A, B, C and D. In other words, when the input signals A, B, C and D form a binary number, say four (0100), the 16 output signals E—W of matrix 10 produce the individual bits of the related Walsh function, in this instance wal(4), and the output signals E, F, L, M, N, P, V and W will be in the high (1) state and the remainder of the output signals of matrix 10 will be in the low (0) state.

The desired Walsh function, say wal(4), is obtained by sequentially scanning the outputs E—W by device 12 which is driven by clock 14 that typically is a part of the computer or multiplexing system which supplies the input signals A, B, C and D. The scanning device 12 can assume any one of a wide variety of forms, such as rotating mechanical switches, electronic gating circuitry, etc., but typically would be electronic circuitry capable of rapid sampling and switching.

Figure 4:
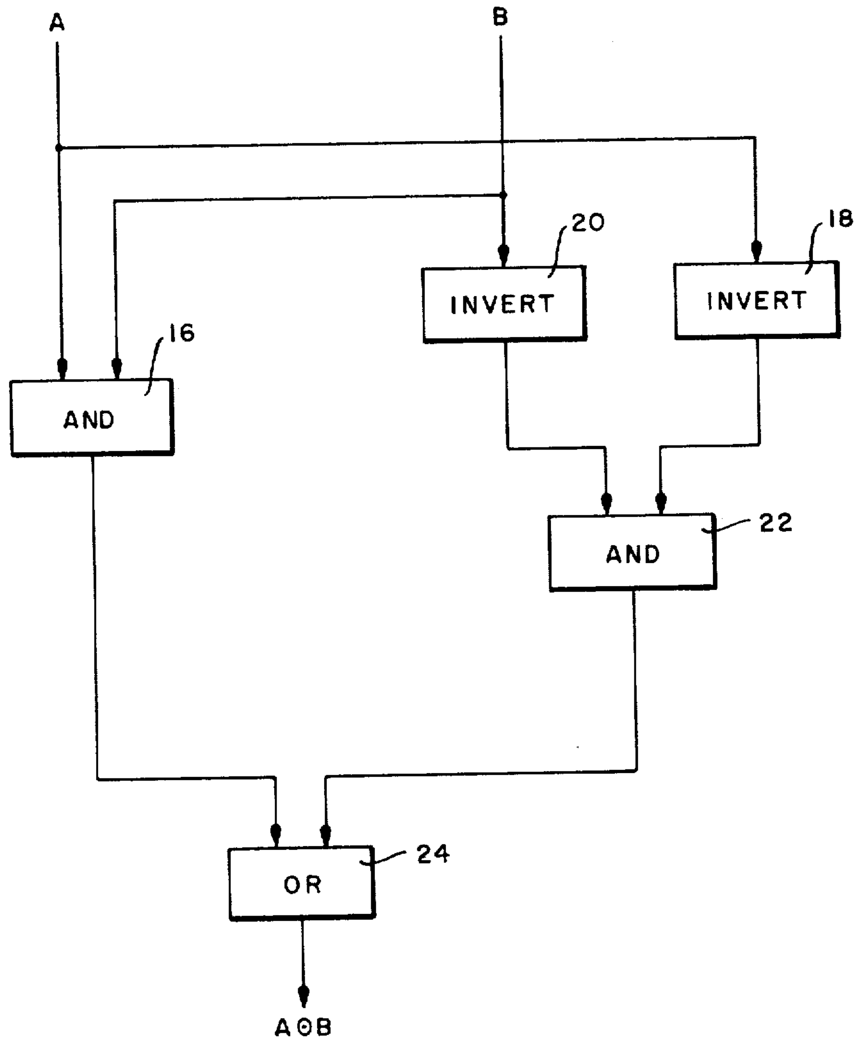
FIG. 4 is a diagram of a basic logic circuit which can be used in the invention.

Likewise, the combining circuits of matrix 10 can be in a variety of forms, one of which is partially illustrated in FIG. 4. In FIG. 4 the input signals A and B are shown connected to AND gate 16 and, respectively, to inverting circuits 18 and 20. The inverting circuits are in turn connected to AND gate 22. The outputs of AND gates 16 and 22 are connected to OR gate 24, the output of which is the product $A \odot B = AB + \bar{A}\bar{B}$ = output signal G (FIG. 3) where $\bar{A}$ is the complement, or inversion, of A.

Readers familiar with the art of Boolean logic will, of course, recognize that FIG. 4 illustrates a form of Exclusive-OR circuit which is more correctly termed a Material Equivalence circuit; the symbol $\odot$ stands for the "material equivalence" mathematical operation herein, as defined by the equations in FIG. 3. The reader will be aware that if the output of OR gate 24 is applied, together with the input command signal C, to a similar second stage Material Equivalence circuit, the output of the second stage will be $A \odot B \odot C = ABC + A\bar{B}\bar{C} + \bar{A}B\bar{C} + \bar{A}\bar{B}C$ which is the output signal K (FIG. 3). Usc of a third stage Material Equivalence circuit with the input signal D will produce the product $A \odot B \odot C \odot D = ABCD + AB\bar{C}\bar{D} + \bar{A}\bar{B}CD + \bar{A}\bar{B}\bar{C}\bar{D} + A\bar{B}C\bar{D} + A\bar{B}\bar{C}D + \bar{A}BC\bar{D} + \bar{A}B\bar{C}D$ = the output signal R of FIG. 3. Additional stages of combining in Material Equivalence circuits produce expanded products which, while obvious, are omitted because of their complexity. Such expanded products would, however, be required in the event more than four-bit input command signals are used.

The operation of the invention is by now apparent. Input signals A, B, C and D, from a source that need not be specified (but is typically a computer or multiplexing system), are applied to the combining circuits in matrix 10. The output signals E–W of matrix 10 are related to input signals A, B, C and D according to the logic table of FIG. 3 and thereby constitute the sequential bits of the Walsh function commanded by binary input signals A, B, C and D. Output signals E–W are obtained in matrix 10 by the repetitive use of Exclusive-OR circuitry and inverters, such as shown in FIG. 4. Scanning device 12, which is driven by clock 14 that is typically a part of the system that provides the input signals A, B, C and D, sequentially samples the output signals E–W of matrix 10, the sequential samples becoming the sequential bits of the desired Walsh function output signal of the invention. Since all components of the invention are in a state-of-the-art status that permits the use of a very high frequency clock 14, the desired Walsh functions, or sequences thereof, can be produced at an extremely fast rate.

It is evident that an improved Walsh function generator has been disclosed which is clock driven and rapidly produces desired Walsh functions by operating on N binary type input signals according to predetermined logic to produce the $2^N$ individual bits of the desired Walsh function.

Obviously many modifications and variations of the present invention are possible in the light of the above teachings. For example, more than four input signals might be used, in which event the matrix of combining circuits would produce $2^N$ output signals, where N is the number of input signals to the matrix. Also, when used in the environment of coding or multiplexing, the input signals could be synchronized to change according to predetermined sequences at appropriate counts of the clock that drives the scanning device. It is therefore to be understood, that within the scope of the appended claims, the invention may be practiced otherwise than as specifically described.

What is claimed and desired to be secured by Letters Patent of the United States is:

1. A Walsh function generator comprising:

combining circuit means including a plurality of Material Equivalence circuits for receiving N input command signals of binary type and for producing $2^N$ output signals according to predetermined logic; and scanning means having a single output terminus to sequentially sample said $2^N$ output signals, said sequential signals forming the Walsh function associated with the particular input-signal combination being received by said combining circuit means, one of said output signals being a constant value, N other of said output signals being the inverse of said N input signals, and the remaining $2^N-(N+1)$ of said $2^N$ output signals being obtained from circuits which contain said Material Equivalence circuits.

2. The Walsh function generator of claim 1, wherein each Material Equivalence circuit is connected to receive at least one of said N input signals.

* * * * *